United States Patent [19]
Merchant et al.

[11] Patent Number: 5,512,916
[45] Date of Patent: Apr. 30, 1996

[54] METHOD AND APPARATUS FOR PROCESSING AND SUBSEQUENTLY DISPLAYING TRANSMITTED IMAGE DATA ON AN ACTIVE-ADDRESSED DISPLAY DEVICE

[75] Inventors: Zaffer Merchant, Lantana; Ali Saidi, Boynton Beach, both of Fla.

[73] Assignee: Motorola, Inc., Schaumburg, Ill.

[21] Appl. No.: 312,161

[22] Filed: Sep. 26, 1994

Related U.S. Application Data

[63] Continuation of Ser. No. 65,415, May 24, 1993, abandoned.

[51] Int. Cl.$^6$ .................................................. G09G 3/36
[52] U.S. Cl. ................................ 345/98; 345/100
[58] Field of Search ........................... 345/87, 98, 100, 345/202, 901; 329/1, 54, 55; 340/825.44, 825.52; 455/185.1, 186.2, 186.1, 32.1

[56] References Cited

U.S. PATENT DOCUMENTS

| | | |
|---|---|---|
| 4,389,673 | 6/1983 | Despois et al. |
| 4,438,432 | 3/1984 | Hurcum ................................ 345/1 |
| 4,551,855 | 11/1985 | Kurosaki et al. ................ 455/32.1 |
| 4,870,399 | 9/1989 | Carlson . |
| 4,952,036 | 8/1990 | Gulick et al. . |
| 5,060,036 | 10/1991 | Choi . |

OTHER PUBLICATIONS

Nehring et al "Ultimate Limit for Matrix Addressing of RMS-Responding Liquid-Crystal Display", 1979, pp. 795–802.

Terry Scheffer and Jurgen Nehring, "Supertwisted Nematic (STN) LCDs," May 17, 1992, paper submitted to 1992 SID International Symposium, Boston, Massachusetts.

Linde et al., "An Algorithm for Vector Quantizer Design", IEEE Transactions on Communications, vol. COM-28, No. 1, published Jan. 1980, pp. 84–95..

*Primary Examiner*—Richard Hjerpe
*Assistant Examiner*—Regina Liang
*Attorney, Agent, or Firm*—Kelly A. Gardner

[57] ABSTRACT

A method, in a data communication receiver having a display, for processing received information comprises the steps of receiving (1100) an address, wherein the address is associated with a plurality of image data values, and comparing (1105) the address with stored addresses to determine which one of the stored addresses is equivalent to the address. The method further comprises the step of retrieving (1105) from memory a group of column values associated with the one of the stored addresses which is equivalent to the address, wherein the group of column values is stored in a form suitable for active-addressing columns of the display.

19 Claims, 6 Drawing Sheets

METHOD AND APPARATUS FOR PROCESSING AND SUBSEQUENTLY DISPLAYING TRANSMITTED IMAGE DATA ON AN ACTIVE-ADDRESSED DISPLAY DEVICE

This is a continuation of application Ser. No. 08/065,415, filed May 24, 1993 now abandoned.

FIELD OF THE INVENTION

This invention relates in general to data transmission, and more specifically to processing transmitted data for subsequent display on an active-addressed display device.

BACKGROUND OF THE INVENTION

An example of a direct multiplexed, rms (root mean square) responding electronic display is the well-known liquid crystal display (LCD). In such a display, a nematic liquid crystal material is positioned between two parallel glass plates having electrodes applied to each surface in contact with the liquid crystal material. The electrodes typically are arranged in vertical columns on one plate and horizontal rows on the other plate for driving a picture element (pixel) wherever a column and row electrode overlap.

In rms-responding displays, the optical state of a pixel is substantially responsive to the square of the voltage applied to the pixel, i.e., the difference in the voltages applied to the electrodes on the opposite sides of the pixel. LCDs have an inherent time constant that characterizes the time required for the optical state of a pixel to return to an equilibrium state after the optical state has been modified by changing the voltage applied to the pixel. Recent technological advances have produced LCDs with time constants (approximately 16.7 milliseconds) approaching the frame period used in many video displays. Such a short time constant allows the LCD to respond quickly and is especially advantageous for depicting motion without noticeable smearing or flickering of the displayed image.

Conventional direct multiplexed addressing methods for LCDs encounter a problem when the display time constant approaches the frame period. The problem occurs because conventional direct multiplexed addressing methods subject each pixel to a short duration "selection" pulse once per frame. The voltage level of the selection pulse is typically 7–13 times higher than the rms voltages averaged over the frame period. The optical state of a pixel in an LCD having a short time constant tends to return towards an equilibrium state between selection pulses, resulting in lowered image contrast, because the human eye integrates the resultant brightness transients at a perceived intermediate level. In addition, the high level of the selection pulse can cause alignment instabilities in some types of LCDs.

To overcome the above-described problems, an "active addressing" method for driving rms responding electronic displays has been developed. The active addressing method continuously drives the row electrodes with signals comprising a train of periodic pulses having a common period T corresponding to the frame period. The row signals are independent of the image to be displayed and preferably are orthogonal and normalized, i.e., orthonormal. The term "orthogonal" denotes that, if the amplitude of a signal applied to one of the rows is multiplied by the amplitude of a signal applied to another one of the rows, the integral of this product over the frame period is zero. The term "normalized" denotes that all the row signals have the same rms voltage integrated over the frame period T.

During each frame period a plurality of signals for the column electrodes are calculated and generated from the collective state of the pixels in each of the columns. The column voltage at any time t during the frame period is proportional to the sum obtained by considering each pixel in the column, multiplying a "pixel value" representing the optical state (either −1 for fully "on", +1 for fully "off", or values between −1 and +1 for proportionally corresponding gray shades) of the pixel by the value of that pixel's row signal at time t, and adding the products obtained thereby to the sum.

If driven in the active addressing manner described above, it can be shown mathematically that there is applied to each pixel of the display an rms voltage averaged over the frame period, and that the rms voltage is proportional to the pixel value for the frame. The advantage of active addressing is that it restores high contrast to the displayed image because, instead of applying a single, high level selection pulse to each pixel during the frame period, active addressing applies a plurality of much lower level (2–5 times the rms voltage) selection pulses spread throughout the frame period. In addition, the much lower level of the selection pulses substantially reduces the probability of alignment instabilities. As a result, utilizing an active addressing method, rms responding electronic displays, such as LCDs utilized in portable radio devices, can display image data at video speeds without smearing or flickering. Additionally, LCDs driven with an active addressing method can display image data having multiple shades without the contrast problems present in LCDs driven with conventional multiplexed addressing methods. Therefore, with the advent of active addressing methods, there exists an opportunity to develop an over-the-air communication system in which image data can be transmitted, using known data compression techniques, to a portable radio device. The portable radio device could thereafter decompress and display the image data on a conventional LCD driven with active addressing methods such as described above. However, most data compression and decompression techniques involve a large number of complex calculations, which can be performed by either software or hardware. Similarly, implementation of active addressing methods also involves complex calculations to calculate and generate the column signals applied to pixels in the columns of the LCD. These known data decompression and active addressing methods, therefore, would increase the amount of circuitry needed within a portable radio device, thereby increasing the size of the device and decreasing the battery life of the device, both of which are considered very undesirable from a consumer standpoint.

Thus, what is needed is a portable radio device in which image data can be decompressed and displayed without increasing the size of the radio device due to required decompression and addressing circuitry. Additionally, reduction in the battery life of the radio device should be minimized.

SUMMARY OF THE INVENTION

A data communication receiver has a display driven according to addressing techniques in which the display is driven with orthonormal signals. A method in the data communication receiver for processing received information includes the steps of receiving an address, wherein the address is associated with a single column of image data values, and comparing the address with stored addresses to determine which one of the stored addresses is equivalent to the address. The method further comprises the step of retrieving from memory a group of column values associated with the one of the stored addresses which is equivalent to the address. The group of column values has been previously derived by transforming the single column of the image data values into another domain according to the addressing techniques and subsequently stored in the memory prior to operation of the data communication receiver, and wherein the group of column values is to be utilized for driving a single column of the display.

An electronic device receives and displays information on a display driven according to addressing techniques in which rows of the display are driven with orthonormal signals. The electronic device includes a receiver for receiving addresses and a memory for storing predetermined addresses and groups of column values. Each predetermined address is associated with a single group of column values, and each group of column values has been previously derived by transforming a single column of image data values into another domain according to the addressing techniques and subsequently stored in the memory prior to operation of the data communication receiver. Each group of column values is to be utilized for driving a single column of the display. A determining circuit is included in the data communication receiver for determining which ones of the groups of column values are associated with predetermined addresses that are equivalent to the addresses received by the receiver. Column signal generating circuitry generates column signals from the ones of the groups of column values, wherein the column signals are utilized to drive the columns of the display in accordance with the addressing techniques.

DESCRIPTION OF A PREFERRED EMBODIMENT

Figure 1:
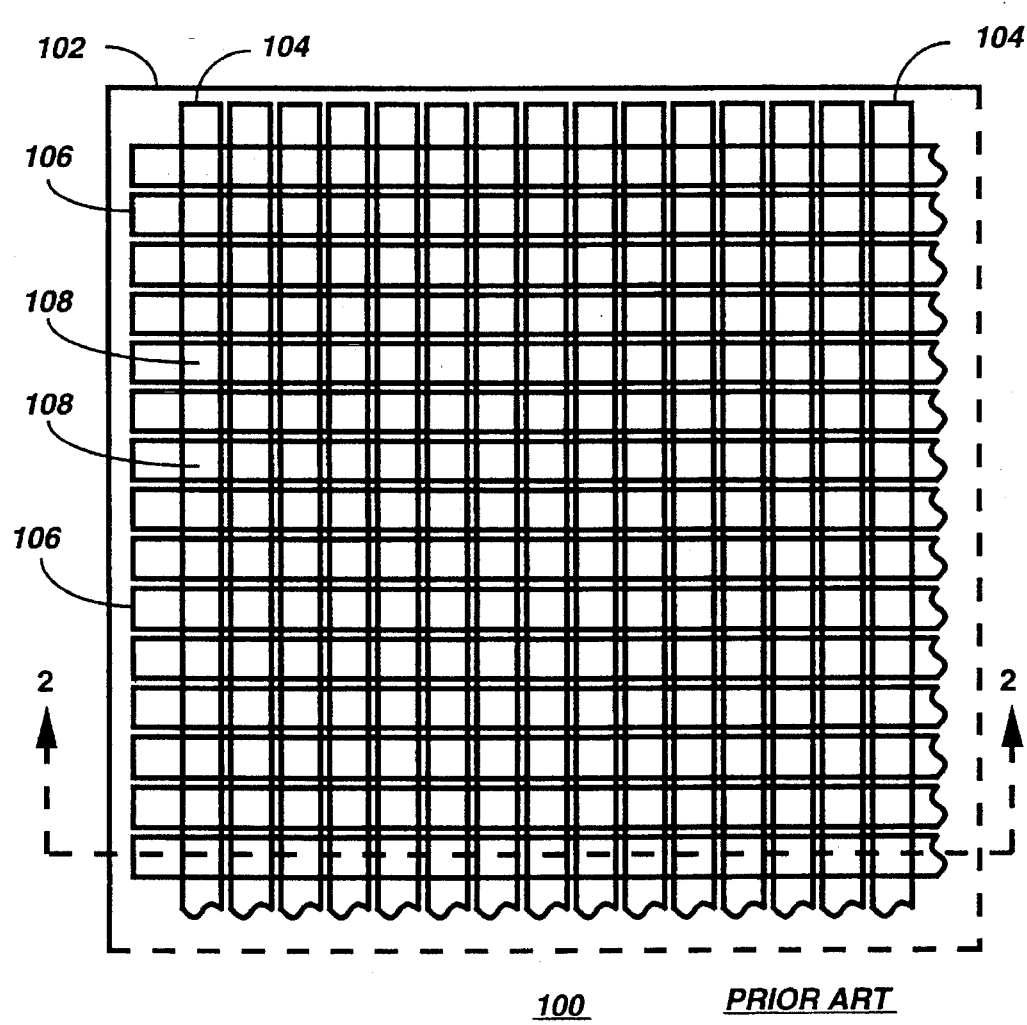
FIG. 1 is a front orthographic view of a portion of a conventional liquid crystal display.
Figure 2:
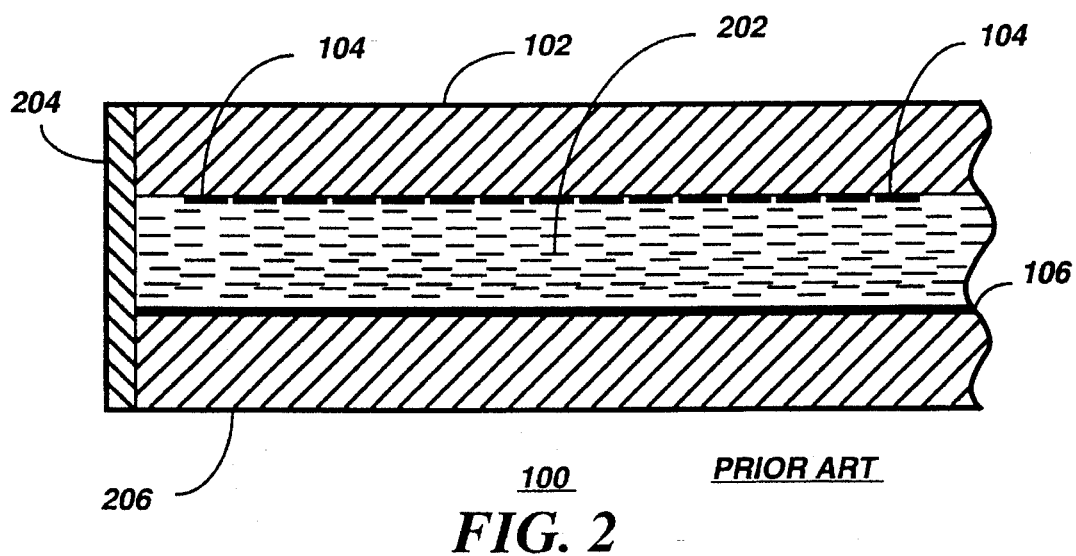
FIG. 2 is an orthographic cross-section view along the line 2—2 of FIG. 1 of the portion of the conventional liquid crystal display.

Referring to FIGS. 1 and 2, orthographic front and cross-section views of a portion of a conventional liquid crystal display (LCD) 100 depict first and second transparent substrates 102, 206 having a space therebetween filled with a layer of liquid crystal material 202. A perimeter seal 204 prevents the liquid crystal material from escaping from the LCD 100. The LCD 100 further includes a plurality of transparent electrodes comprising row electrodes 106 positioned on the second transparent substrate 206 and column electrodes 104 positioned on the first transparent substrate 102. At each point at which a column electrode 104 overlaps a row electrode 106, such as the overlap 108, voltages applied to the overlapping electrodes 104, 106 can control the optical state of the liquid crystal material 202 therebetween, thus forming a controllable picture element, hereafter referred to as a "pixel". While an LCD is the preferred display element in accordance with the preferred embodiment of the present invention, it will be appreciated that other types of display elements may be used as well, provided that such other types of display elements exhibit optical characteristics responsive to the square of the voltage applied to each pixel, similar to the root mean square (rms) response of an LCD.

Figures 3, 4:
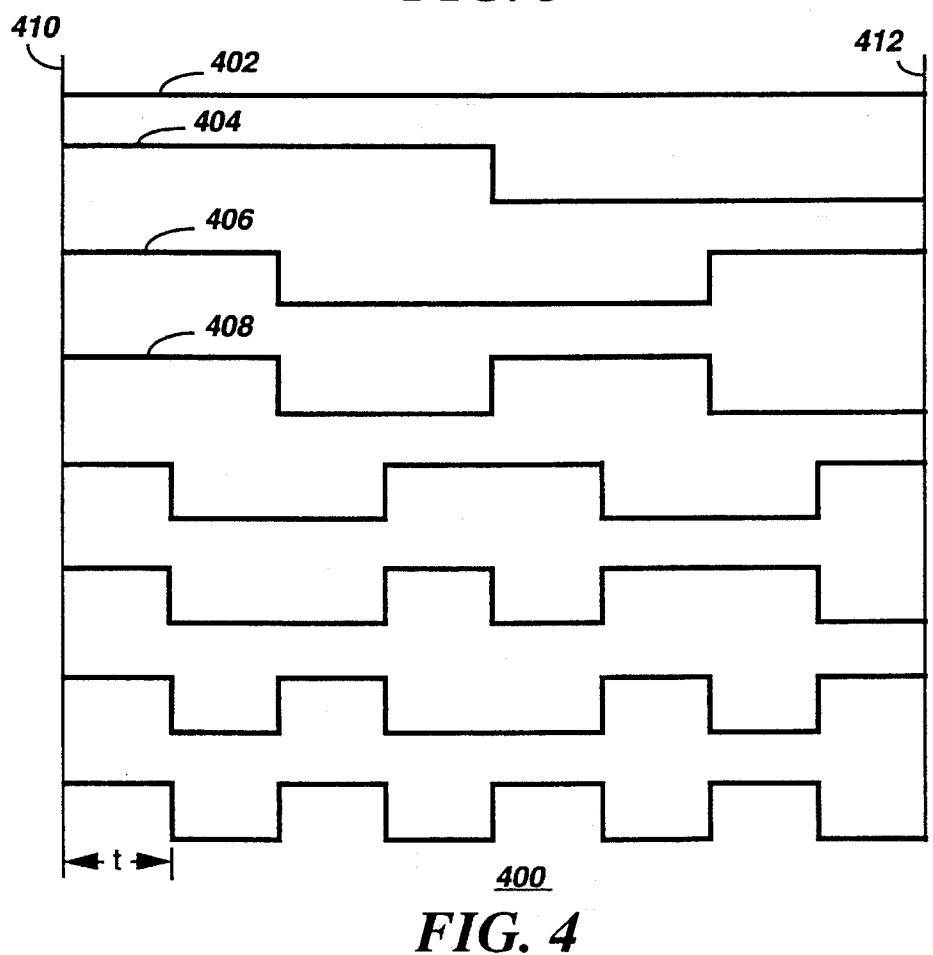
FIG. 3 is a matrix of Walsh functions in accordance with the present invention.
FIG. 4 depicts drive signals corresponding to the Walsh functions of FIG. 3 in accordance with the present invention.

Referring to FIGS. 3 and 4, an eight-by-eight (third order) matrix of Walsh functions 300 and the corresponding Walsh waves 400 in accordance with the preferred embodiment of the present invention are shown. Walsh functions are both orthogonal and normalized, i.e., orthonormal, and are therefore preferable for use in an active-addressed display system, as briefly discussed in the Background of the Invention herein above. It may be appreciated by one of ordinary skill in the art that other classes of functions, such as Pseudo Random Binary Sequence (PRBS) functions or Direct Cosine Transform (DCT) functions, may also be utilized in active-addressed display systems.

When Walsh functions are used in an active-addressed display system, voltages having levels represented by the Walsh waves 400 are uniquely applied to a selected plurality of electrodes of the LCD 100. For example, the Walsh waves 404, 406, and 408 could be applied to the first (uppermost), second and third row electrodes 106, respectively, and so on. In this manner, each of the Walsh waves 400 would be applied uniquely to a corresponding one of the row electrodes 106. It is preferable not to use the Walsh wave 402 in an LCD application because the Walsh wave 402 would bias the LCD 100 with an undesirable DC voltage.

It is of interest to note that the values of the Walsh waves 400 are constant during each time slot t. The duration of the time slot t for the eight Walsh waves 400 is one-eighth of the duration of one complete cycle of Walsh waves 400 from start 410 to finish 412. When using Walsh waves for actively addressing a display, the duration of one complete cycle of the Walsh waves 400 is set equal to the frame duration, i.e., the time to receive one complete set of data for controlling all the pixels 108 of the LCD 100. The eight Walsh waves 400 are capable of uniquely driving up to eight row electrodes 106 (seven if the Walsh wave 402 is not used). It will be appreciated that a practical display has many more rows. For example, displays having four-hundred-eighty rows and six-hundred-forty columns are widely used today in laptop computers. Because Walsh function matrices are available in complete sets determined by powers of two, and because the orthonormality requirement for active addressing does not allow more than one electrode to be driven from each Walsh wave, a five-hundred-twelve by five-hundred-twelve ($2^9 \times 2^9$) Walsh function matrix would be required to drive a display having four-hundred-eighty row electrodes 106. For this case, the duration of the time slot t is $1/512$ of the frame duration. Four-hundred-eight Walsh waves would be used to drive the four-hundred-eighty row electrodes 106, while the remaining thirty-two, preferably including the first Walsh wave 402 having a DC bias, would be unused.

Figure 5:
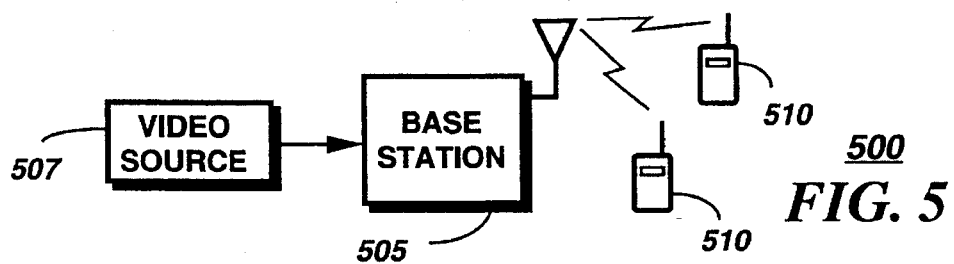
FIG. 5 is an illustration of a radio communication system comprising a base station for transmitting compressed image data to data communication receivers in accordance with the present invention.

Referring next to FIG. 5, a radio communication system 500 comprises a base station 505 for transmitting radio frequency (RF) signals to data communication receivers 510 located within the coverage area thereof. According to the present invention, the base station 505 is capable of receiving image data from a video source 507, such as a video camera. The base station 505 periodically compresses and encodes the image data for transmission as an RF signal. The data communication receivers 510, which may be, for example, pagers or other portable radio devices, receive the RF signal and display the information contained therein on active-addressed display devices, such as the LCD 100 (FIG. 1).

When the data communication receivers 510 are portable radio devices, such as pagers or two-way radios, size is of great concern because users typically prefer lightweight, streamlined portable radio devices which are not too bulky and do not interfere with clothing, pocketbooks, etc. Furthermore, battery life is very important because users of portable radio devices do not want to be inconvenienced by having to often replace batteries, which are sometimes expensive. Therefore, in accordance with the preferred embodiment of the present invention, the data communication receivers 510 and the base station 505 process image data in such a manner that complex data decompression circuitry is not required in a data communication receiver 510, thereby preventing unnecessary increases in size or decreases in battery life.

Figure 6:
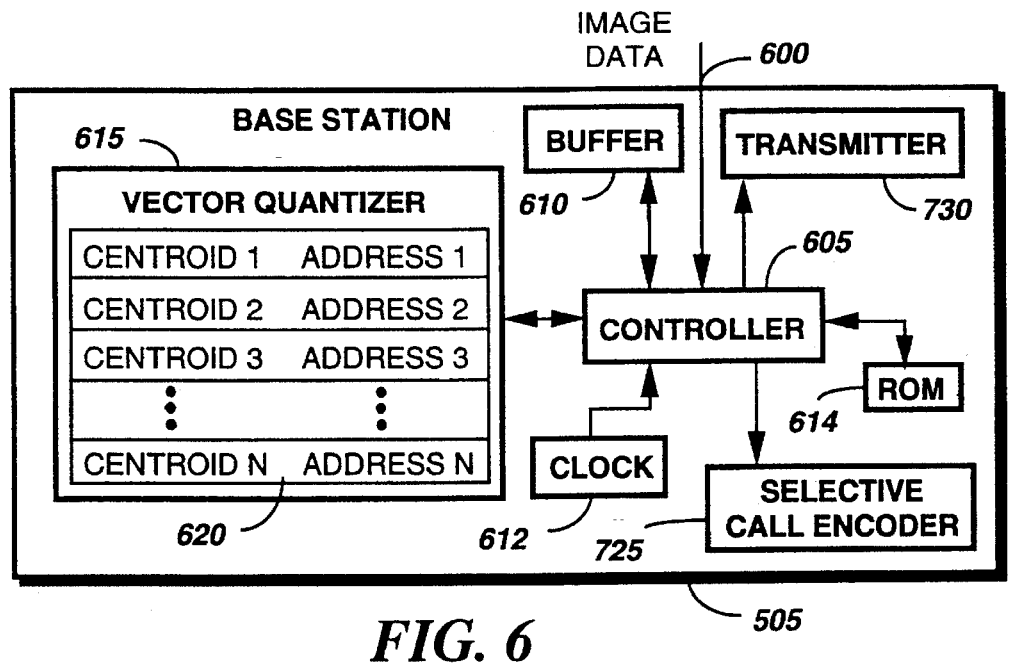
FIG. 6 is an electrical block diagram of the base station of FIG. 5 for compressing image data for radio frequency transmission in accordance with the present invention.

FIG. 6 is an electrical block diagram of the base station 505 in accordance with the present invention. The base station 505 comprises an input 600 for receiving the image data from the video source 507 (FIG. 5) and providing the image data to a controller 605 for processing thereby. The base station 505 further comprises a buffer 610 coupled to the controller 605 for temporarily storing the image data and a clock 612 coupled to the controller for providing real time values utilized in system timing. A memory, such as a read only memory (ROM) 614, stores subroutines executed by the controller 605 during operation of the base station 505.

Further included in the base station 505 is compression circuitry for compressing the image data. Preferably, the compression circuitry comprises a vector quantizer 615 for receiving and compressing a plurality of image data values provided to the vector quantizer 615 by the controller 605. The plurality of image data values may, for example, comprise a vector defined by a column of values included in an image data matrix formed from received image data. The vector quantizer 605 proceeds in a conventional manner to quantize the received column vector to a closest one of a number of predetermined levels, each defined by a plurality of values. For example, one of the predetermined levels could be a vector defined by the values ($x_1$, $y_1$, $z_1$). The predetermined levels are hereafter referred to as "centroids" because, as is well known to one of ordinary skill in the art, the column vectors of the image data matrix tend to cluster about the predetermined levels, i.e., centroids. The number of centroids is determined by the number of bits of the vector quantizer 605. When, for instance, the vector quantizer 605 is an eight-bit quantizer, the column vector can be quantized to any of two-hundred fifty-six predetermined levels or centroids.

Figure 7:
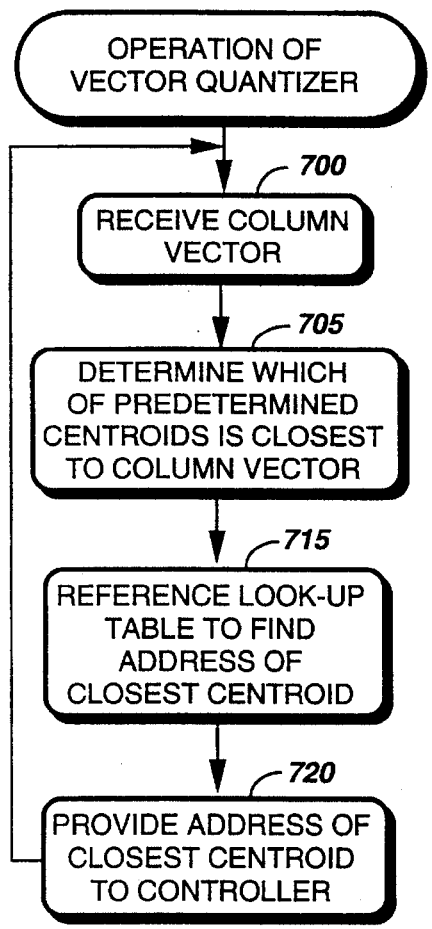
FIG. 7 is a flowchart depicting the operation of compression circuitry included in the base station of FIG. 5 in accordance with the present invention.

FIG. 7 is a flowchart depicting the operation of the vector quantizer 615 (FIG. 6). When, at step 700, the vector quantizer 615 receives a column vector, e.g., a column of an image matrix, from the controller 605, the vector quantizer 615 determines, at step 705, which of the predetermined centroids is closest to the column vector. One method by which the closest centroid may be determined is by plotting the column vector and the predetermined centroids, as may be better understood by referring to FIG. 8.

Figure 8:
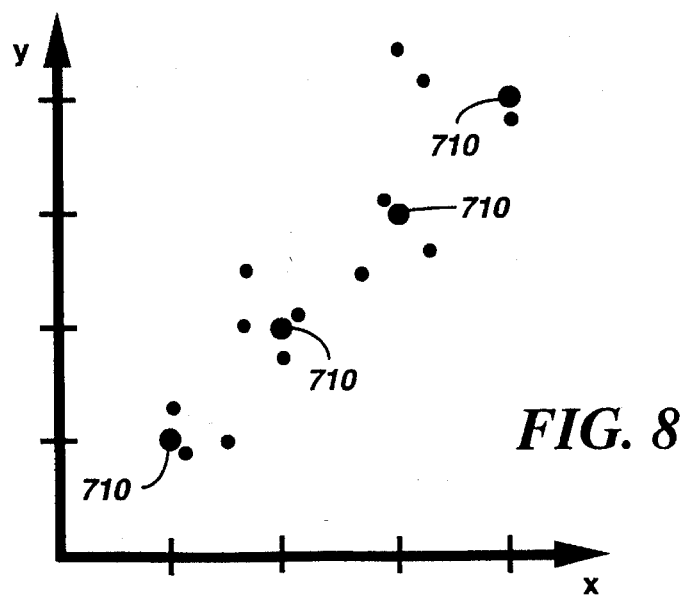
FIG. 8 depicts predetermined levels of the compression circuitry and vectors of an image data matrix plotted along x- and y-coordinates in accordance with the present invention.

FIG. 8 is a plot of predetermined centroids 710 and column vectors, shown as the smaller points surrounding the centroids 710. For illustrative purposes only, each of the column vectors provided to the vector quantizer 615 comprises only two values and is therefore only plotted using x- and y-coordinates, although it will be appreciated that column vectors comprising a greater number of values are plotted utilizing an equivalent number of coordinates. For example, a column vector having ten values would be plotted in ten dimensions. Additionally, to simplify the illustration, the plot shows only four predetermined centroids 710, which correspond to a two-bit vector quantizer. The two-bit vector quantizer determines from the plot which of the centroids 710 is closest to each of the plotted column vectors.

Returning to FIG. 7, once it has been determined, at step 705, which predetermined centroid is closest to the received column vector, the vector quantizer 615 references, at step 715, a look-up table 620 (FIG. 6) or other such memory device, which comprises a listing of the centroids and addresses corresponding thereto. Subsequently, the vector quantizer 615 provides, at step 720, the address corresponding to the closest centroid to the controller 605. In this manner, compression of the image data occurs when a plurality of values, i.e., a column vector, is compressed to a single value, i.e., an address.

Returning next to FIG. 6, the base station 505 further comprises a selective call encoder 725 coupled to the controller 605 for encoding the compressed data, i.e., the addresses provided by the vector quantizer 615, into a suitable paging format, such as POCSAG (Post Office Code Standardization Advisory Group) or GSC (Golay Sequential Code). A transmitter 730 coupled to the controller 605 transmits the encoded information as a radio frequency (RF) signal.

Figure 9:
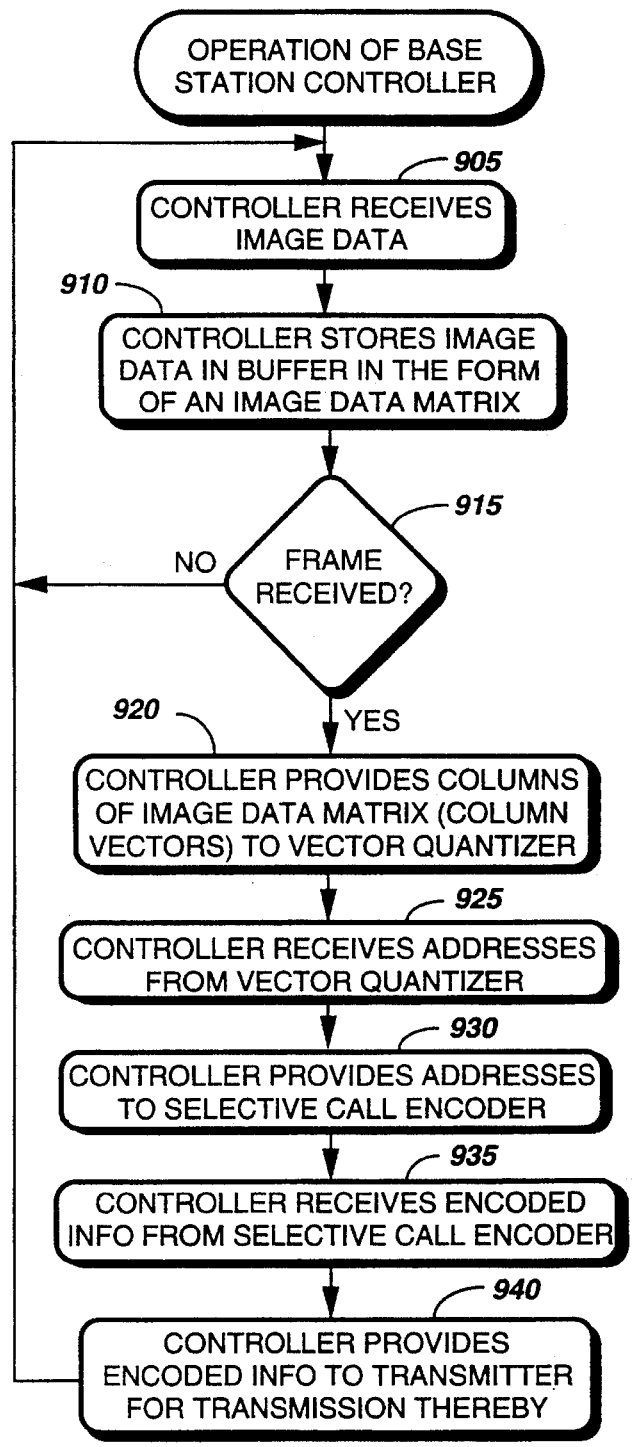
FIG. 9 is a flowchart depicting the operation of the controller included in the base station of FIG. 5 in accordance with the present invention.

FIG. 9 is a flowchart depicting the operation of the base station controller 605 (FIG. 6) in accordance with the present invention. As described above, the controller 605 receives, at step 905, the image data from the video source 507 (FIG. 5) and stores, at step 910, the image data in the form of a matrix until, at step 915, a frame of data is received. Thereafter, the controller 605 provides, at step 920, columns of the stored matrix, i.e., column vectors, to the vector quantizer 615, which compresses the data as mentioned above in reference to FIGS. 7 and 8. The controller 605 subsequently, at step 925, receives from the vector quantizer 615 an address associated with each column vector and provides, at step 930, the addresses to the selective call encoder 725. The selective call encoder 725 encodes the addresses into a suitable paging format, after which the encoded information is returned to the controller 605, at step 935. Next, the controller 605 provides, at step 940, the encoded information to the transmitter 730 for transmission thereby as an RF signal.

It will be appreciated that the base station 505 can be implemented by using a conventional terminal/transmitter controller coupled to a "dumb" RF transmitter 730 and further coupled to circuitry for compressing the image data. The controller 605, buffer 610, clock 612, ROM 614, and selective call encoder 725 may be, for example, included in the Model No. MPS-2000 terminal/transmitter controller manufactured by Motorola, Inc. of Schaumburg, Ill. A microcomputer having an internal memory, such as the MC68HC05 microcomputer manufactured by Motorola, Inc., may be employed to implement the vector quantizer 615. Alternatively, the operations of the vector quantizer 615 could be performed by the controller 605.

Figure 10:
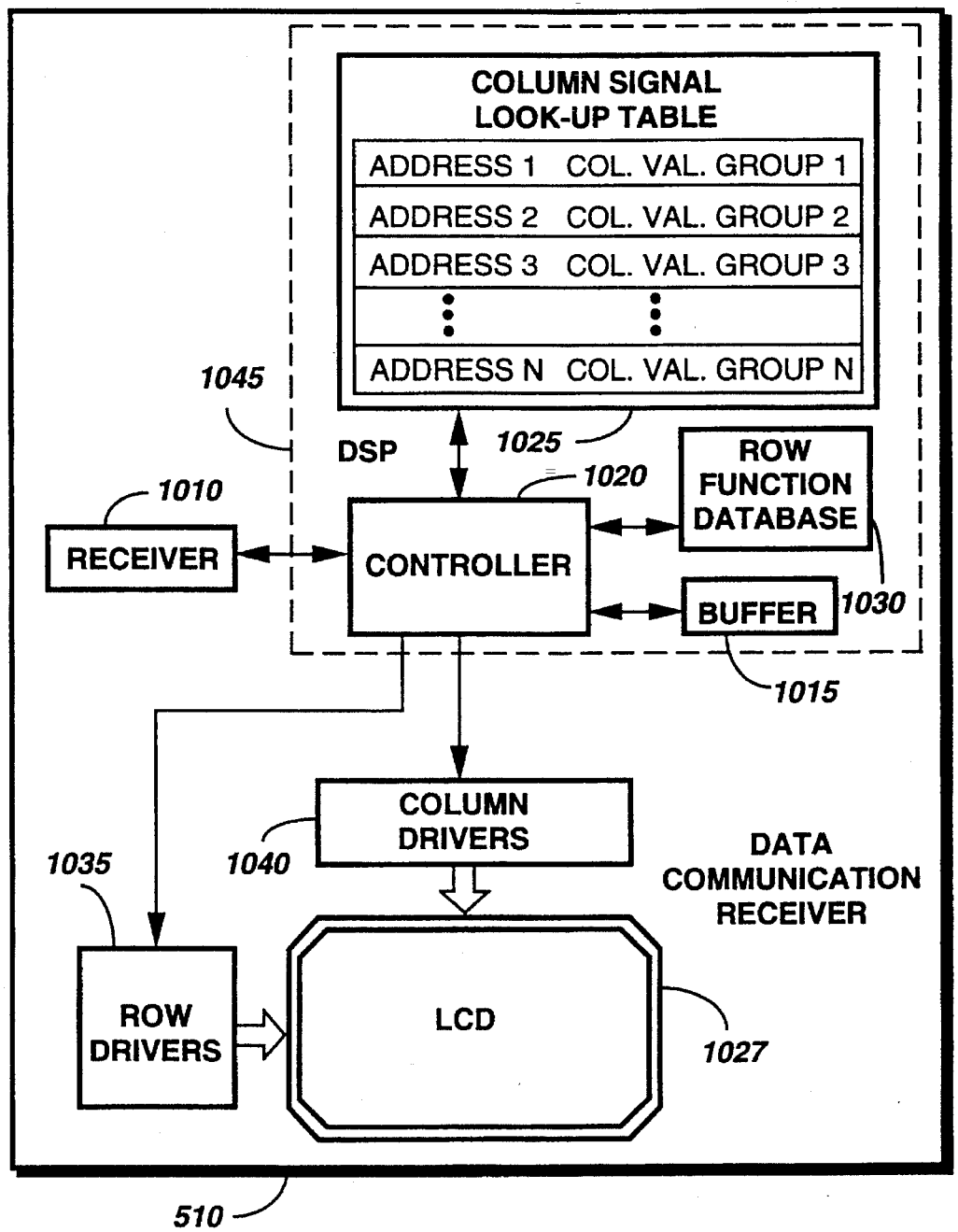
FIG. 10 is an electrical block diagram of a data communication receiver of FIG. 5 in accordance with the present invention.

FIG. 10 is an electrical block diagram of the data communication receiver 510, which preferably comprises a receiver 1010, which receives the RF signal and recovers the addresses included therein, and a buffer 1015, which temporarily stores information, such as the received addresses. A controller 1020 coupled to the receiver 1010 and the buffer 1015 for controlling the operation of the data communication receiver 510 processes each address, by referencing a look-up table 1025, to determine a column signal associated therewith. Preferably, the look-up table 1025, which can be implemented using a memory device such as a read only memory, stores a listing of the addresses which can be transmitted by the base station 505. Additionally, associated with each address is a group of transformed column values, which are also stored in the look-up table 1025. The column values included within each group are preferably stored in predetermined locations or in a predetermined arrangement such that the column values can be retrieved and processed in a predetermined order. Additionally, each group of transformed column values is preferably in a format suitable for driving an active-addressed LCD 1027 included in the data communication receiver 510.

As briefly described herein above in the Background of the Invention, column values suitable for driving an active-addressed display can be generated by transforming each column of image data by orthonormal functions, such as Walsh, PRBS, or DCT functions, which are independent of the image data, to arrive at a group of transformed column values. The transformation of the image data can be accomplished by several conventional methods, for example, Fast Walsh Transforms, Fast Fourier Transforms or modifications thereof, or matrix multiplication. When matrix multiplication is employed, a plurality of transformed column values associated with a given column of image data could be defined by the following equation:

$$CV = I*OM,$$

wherein CV represents the plurality of column values, I represents the column of image data, and OM represents a matrix of orthogonal functions, such as a Walsh matrix, the number of rows of which is greater than or equal to the number of rows included in the LCD 1027 which is to be active-addressed.

It may be appreciated that, because the predetermined levels, i.e., centroids, stored in the look-up table 620 (FIG. 6) of the vector quantizer 615 are known, the centroids can be transformed, using matrix multiplication, Walsh Transforms, etc., into pluralities of column values suitable for active-addressing columns of the LCD 1027. The column values can then be stored in the look-up table 1025 of the data communication receiver 510 and associated in memory with the addresses of the centroids stored in the base station look-up table 620. For instance, if a given address corresponding to a predetermined centroid is transmitted by the base station 505, the data communication receiver 510 can receive the RF signal, recover the address, and reference the look-up table 1025 to determine the plurality of transformed column values corresponding to the predetermined centroid. In this manner, the data communication receiver 510 is not required to conventionally decompress the received addresses. Furthermore, because the column values are stored in an active addressing format, neither the data communication receiver 510 nor the base station 505 needs to include complex circuitry for performing transformations of the image data to generate active-addressing signals.

In conventional systems, on the other hand, a base station might normally compress image data using vector quantization. Thereafter, at the receiver, the data would be decompressed using conventional decompression techniques, subsequent to which the decompressed data would be transformed to address a display. In an active addressing display system, the circuitry for transforming the data into column values for active-addressing the display would possibly be quite complex and require significant amounts of current which could not be sustained by a small, low capacity battery of the type generally included in portable electronic devices. This problem could be alleviated through use of the data communication receiver 510 according to the present invention, which does not require complex decompression and transformation circuitry. As a result, the data communication receiver 510 may be relatively small in size and consume less current than conventional devices for receiving and displaying images.

The data communication receiver 510 further comprises a row function database 1030 for storing orthonormal functions, such as Walsh, PRBS, and DCT-functions, in the form of a row function matrix, the number of rows of which is greater than or equal to the number of rows in the LCD 1027. Row drivers 1035 coupled between the controller 1020 and the LCD 1027 drive the rows of the LCD 1027 with row signals derived from the rows of the row function matrix, and column drivers 1040 drive the columns of the LCD 1027 with column signals derived in a conventional manner from the column values provided by the controller 1020. In accordance with conventional active addressing methods, the rows and columns of the LCD 1027 are driven at approximately the same time with the row and column signals.

The controller 1020, the buffer 1015, the row function database 1030, and the look-up table 1025 may be, for example, included in a digital signal processor (DSP) 1045, such as Model No. DSP56000 manufactured by Motorola, Inc., or implemented by hard wired circuitry which performs equivalent operations. The row drivers 1035 can be implemented using Model No. SED1704 row drivers manufactured by Seiko Epson Corporation, and the column drivers 1040 can be implemented using Model No. SED1779DOA column drivers manufactured by Seiko Epson Corporation.

Figure 11:
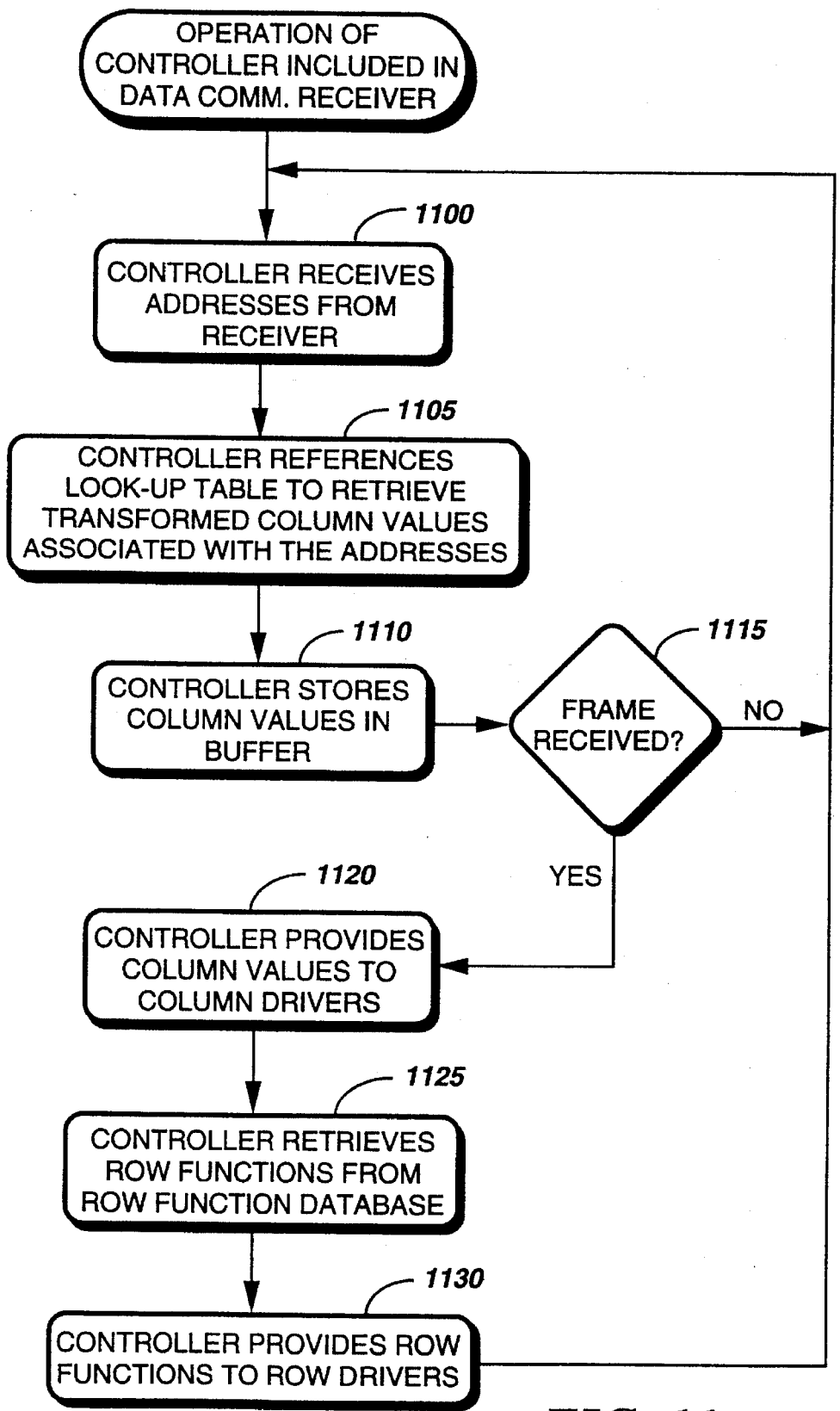
FIG. 11 is a flowchart depicting the operation of the controller included in the data communication receiver of FIG. 5 in accordance with the present invention.

Referring next to FIG. 11, a flowchart depicts the operation of the controller 1020. According to the present invention, the controller 1020 receives, at step 1100, the addresses recovered by the receiver 1010. Subsequently, the controller 1020 references, at step 1105, the look-up table 1025 to retrieve the plurality of transformed column values associated with the received addresses. Preferably, the column values are temporarily stored, at step 1110, in the buffer 1015 until a frame of data has been received, at step 1115. The controller 1020 thereafter provides, at step 1120, the column values to the column drivers 1040 (FIG. 10) for driving columns of the LCD 1027 with column signals derived therefrom. Additionally, the controller 1020 retrieves, at step 1125, the orthonormal row functions from the row function database 1030 and provides, at step 1130, the row functions to the row drivers 1035 for driving rows of the LCD 1027.

In summary, the communication system according to the present invention reduces the complexity of a portable radio device, such as the data communication receiver described above, by eliminating the need for decompression circuitry and transformation circuitry within the data communication receiver. More specifically, the data communication receiver in accordance with the present invention receives compressed image data, which is then immediately converted into transformed column values for driving the columns of an active-addressed LCD. The compressed image data, which is in the form of addresses in a look-up table, is simply and conveniently converted by referencing the look-up table to retrieve a plurality of transformed column values associated with each of the addresses. In this manner, the data communication receiver avoids having to decompress the data. The data communication receiver further avoids having to transform the decompressed image data into a format suitable for addressing the LCD. Therefore, the data communication receiver is smaller and drains less current than would a conventional radio device, which would normally decompress the data and subsequently process the data to result in signals for driving an active-addressed display.

It may be appreciated by now that there has been provided a portable radio device in which compressed image data can be processed to generate signals suitable for actively addressing an LCD without substantially increasing the size of the radio device due to required decompression and addressing circuitry. Additionally, reduction in the battery life of the radio device is minimized.

What is claimed is:

1. A method for processing received information, in a data communication receiver having a display driven according to addressing techniques in which the display is driven with orthonormal signal, for processing received information, the method comprising the steps of:

receiving an address, wherein the address is associated with a single column of image data values;

comparing the address with stored addresses to determine which one of the stored addresses is equivalent to the address;

retrieving from memory a group of column values associated with the one of the stored addresses which is equivalent to the address, wherein the group of column values has been previously derived by transforming the single column of the image data values into another domain according to the addressing techniques and subsequently stored in the memory prior to operation of the data communication receiver, and wherein the group of column values is to be utilized for driving a single column of the display.

2. The method according to claim 1, wherein the retrieving step comprises the step of:

retrieving from memory a group of column values associated with the one of the stored addresses which is equivalent to the address, wherein the group of column values comprises values resulting from transforming the single column of image data values utilizing a Walsh transform.

3. The method according to claim 1, wherein the retrieving step comprises the step of:

retrieving from memory a group of column values associated with the one of the stored addresses which is equivalent to the address, wherein the group of column values comprises values resulting from multiplying an image matrix representative of the single column of image data values with an orthonormal matrix representative of a plurality of functions which are orthogonal and normalized.

4. The method according to claim 1, further comprising the step of:

driving the single column of the display with column signals derived from the group of column values.

5. The method according to claim 4, further comprising the step of:

driving rows of the display with row signals derived from functions which are orthogonal and normalized.

6. An electronic device for receiving and displaying information on a display driven according to active addressing techniques in which the display is driven with orthonormal signals, the electronic device comprising:

a receiver for receiving addresses;

a memory coupled to the receiver for storing predetermined addresses and groups of column values, wherein each predetermined address is associated with a single group of column values, and wherein each group of column values has been previously derived by transforming a single column of image data values into another domain according to the active addressing techniques and subsequently stored in the memory prior to operation of the data communication receiver, and wherein each group of column values is to be utilized for driving a single column of the display;

determining means coupled to the receiver and the memory for determining which ones of the groups of column values are associated with predetermined addresses that are equivalent to the addresses received by the receiver; and column signal generating means coupled to the determining means for generating column signals from the ones of the groups of column values, wherein the column signals are utilized to drive the columns of the display in accordance with the addressing techniques.

7. The electronic device according to claim 6, wherein the determining means comprises a controller.

8. The electronic device according to claim 6, wherein the column signal generating means comprises column drivers.

9. The electronic device according to claim 6, wherein the display comprises a liquid crystal display.

10. The electronic device according to claim 6, further comprising:

a database for storing a plurality of row functions which are orthogonal and normalized; and row signal generating means coupled to the database and the display for generating from the row functions a plurality of row signals with which rows of the display are driven in accordance with the addressing techniques.

11. The electronic device according to claim 10, wherein the row signal generating means comprises row drivers.

12. A data communication receiver for receiving and displaying information on a liquid crystal display driven in accordance with addressing techniques in which the display is driven with orthonormal signals, the data communication receiver comprising:

a receiver for receiving addresses;

a memory coupled to the receiver for storing predetermined addresses and groups of column values, wherein each predetermined address is associated with a single group of column values, and wherein each group of column values has been previously derived by transforming a single column of image data values into another domain according to the addressing techniques and subsequently stored in the memory prior to operation of the data communication receiver, and wherein each group of column values is to be utilized for driving a single column of the liquid crystal display;

a controller coupled to the receiver and the memory for determining which ones of the groups of column values are associated with predetermined addresses that are equivalent to the addresses received by the receiver; and column drivers coupled to the controller for generating column signals from the ones of the groups of column values, wherein the column signals are utilized to drive the columns of the liquid crystal display in accordance with the addressing techniques.

13. The data communication receiver according to claim 12, further comprising:

a database for storing a plurality of row functions which are orthogonal and normalized; and row drivers coupled to the database and the display for generating from the row functions a plurality of row signals with which rows of the liquid crystal display are driven in accordance with the addressing techniques.

14. A communication system, comprising:

a base station for receiving and compressing image data values utilizing a vector quantization technique in which columns of an image data matrix formed from the image data values are represented by addresses, wherein the base station further transmits the addresses representative of the columns of the image data matrix as a radio frequency (RF) signal; and a data communication receiver coupled to the base station for displaying information on a display driven in accordance with addressing techniques in which the display is driven with orthonormal signals, the data communication receiver comprising:

a receiver for receiving the addresses transmitted by the base station;

a memory coupled to the receiver for storing predetermined addresses and groups of column values, wherein each predetermined address is associated with a single group of column values, and wherein each group of column values has been previously derived by transforming single columns of the image data matrix into another domain according to the addressing techniques and subsequently stored in the memory prior to operation of the data communication receiver, and wherein each group of column values is to be utilized for driving a single column of the display;

determining means coupled to the receiver and the memory for determining which ones of the groups of column values are associated with predetermined addresses that are equivalent to the addresses received by the receiver; and column signal generating means coupled to the determining means for generating column signals from the ones of the groups of column values, wherein the column signals are utilized to drive the columns of the display in accordance with the addressing techniques.

15. The communication system according to claim 14, wherein the display comprises a liquid crystal display.

16. The communication system according to claim 14, further comprising:

a database for storing a plurality of row functions which are orthogonal and normalized; and row signal generating means coupled to the database and the display for generating from the row functions a plurality of row signals with which rows of the display are driven in accordance with the addressing techniques.

17. The communication system according to claim 14, wherein the base station comprises:

receiving means for receiving the image data values;

a vector quantizer coupled to the receiving means for generating the addresses which represent the columns of the image data matrix representative of the image data values; and a transmitter coupled to the vector quantizer for transmitting the addresses as the RF signal.

18. The communication system according to claim 14, wherein the columns of the image data matrix is transformed utilizing a Walsh transform.

19. The communication system according to claim 14, wherein the column of the image data matrix is transformed by multiplying the column of the image data matrix with an orthonormal matrix representative of a set of functions that are orthogonal and normalized.

* * * * *